US008430192B2

(12) United States Patent
Gillett

(10) Patent No.: US 8,430,192 B2
(45) Date of Patent: Apr. 30, 2013

(54) ROBOTIC OMNIWHEEL VEHICLE

(75) Inventor: Carla R. Gillett, Sacramento, CA (US)

(73) Assignee: Carla R. Gillett, Sacramento, CA (US)

( * ) Notice: Subject to any disclaimer, the term of this patent is extended or adjusted under 35 U.S.C. 154(b) by 476 days.

(21) Appl. No.: 12/655,569

(22) Filed: Jan. 4, 2010

(65) Prior Publication Data

US 2011/0162896 A1  Jul. 7, 2011

(51) Int. Cl.
*B60K 1/00* (2006.01)
(52) U.S. Cl.
USPC ............ 180/65.51; 180/2.2; 180/21; 180/408
(58) Field of Classification Search ................... 180/2.2, 180/199, 21, 65.1, 65.51, 408, 315, 444
See application file for complete search history.

(56) References Cited

U.S. PATENT DOCUMENTS

| | | | | |
|---|---|---|---|---|
| 962,308 | A * | 6/1910 | Burnett | 16/47 |
| 3,789,947 | A * | 2/1974 | Blumrich | 180/6.48 |
| 4,223,753 | A * | 9/1980 | Bradbury | 180/6.2 |
| 4,599,030 | A * | 7/1986 | Skaalen et al. | 414/460 |
| 5,439,408 | A * | 8/1995 | Wilkinson | 446/409 |
| 5,533,921 | A * | 7/1996 | Wilkinson | 446/409 |
| 5,643,041 | A * | 7/1997 | Mukaida | 446/455 |
| 5,690,185 | A * | 11/1997 | Sengel | 180/65.1 |
| 6,367,571 | B1 * | 4/2002 | Schwarz | 180/253 |
| 7,056,185 | B1 * | 6/2006 | Anagnostou | 446/456 |
| 7,137,470 | B2 * | 11/2006 | Gotz | 180/264 |
| 7,426,970 | B2 * | 9/2008 | Olsen | 180/65.1 |
| 7,460,941 | B2 * | 12/2008 | Sychra et al. | 701/50 |
| 7,748,490 | B2 * | 7/2010 | Hornick et al. | 180/316 |
| 7,789,175 | B2 * | 9/2010 | Tobey et al. | 180/65.1 |
| 7,934,572 | B2 * | 5/2011 | Hammonds | 180/6.64 |
| 7,980,335 | B2 * | 7/2011 | Potter | 180/7.1 |
| 8,025,551 | B2 * | 9/2011 | Torres et al. | 446/431 |
| 8,108,104 | B2 * | 1/2012 | Hrovat et al. | 701/38 |
| 8,269,447 | B2 * | 9/2012 | Smoot et al. | 318/489 |
| 2002/0175009 | A1 * | 11/2002 | Kress | 180/65.2 |
| 2004/0079560 | A1 * | 4/2004 | Hammonds | 180/6.48 |
| 2004/0112656 | A1 * | 6/2004 | Bowen | 180/65.5 |
| 2008/0066979 | A1 * | 3/2008 | Carter | 180/65.5 |
| 2010/0147609 | A1 * | 6/2010 | Gorgas et al. | 180/65.51 |

* cited by examiner

*Primary Examiner* — Katy M Ebner
*Assistant Examiner* — Emma K Frick

(57) ABSTRACT

A robotic omniwheel vehicle includes autonomous drive logic with laser Radar, GPS for vehicle self guidance, obstacle avoidance and range finding location and also to control the omniwheel assemblies having multi-directional steering, extension and lift actuation via a universal joint and a transmission rod that also supports the chassis while traveling at speeds ranging from low to high velocity on and off road, and on rails. The navigational system control methods use manual driving, a cell phone controller comprising satellite telecommunication with voice command, and a touch screen control panel, an omnichair which can rise up and swivel on point, and may also include electromagnetic coupling devices to connect omnivehicles together.

1 Claim, 18 Drawing Sheets

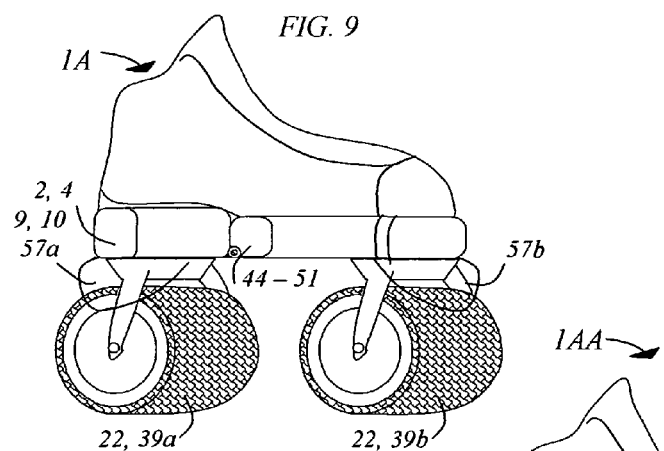
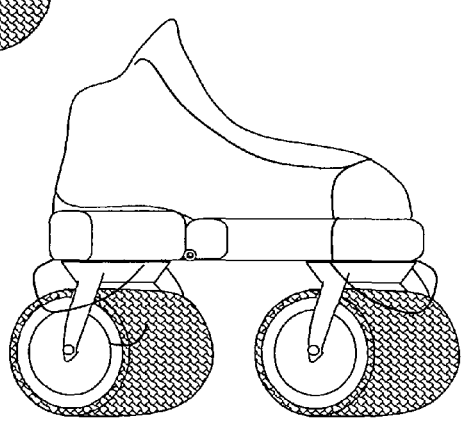
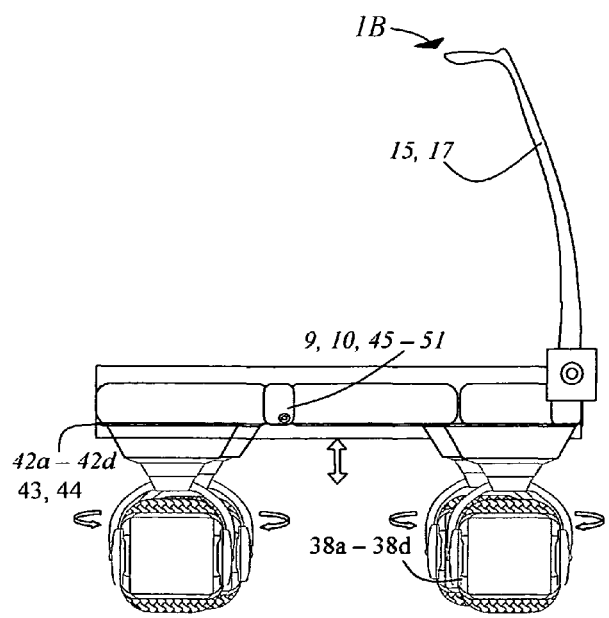

ROBOTIC OMNIWHEEL VEHICLE

CROSS REFERENCED TO RELATED APPLICATIONS

U.S. Pat. No. 8,039,978 B2 Date: Oct. 18, 2011 title: Renewable Energy Power System: Gillett

STATEMENT REGARDING FEDERALLY SPONSORED RESEARCH & DEVELOPMENT

Non Applicable

REFERENCE TO SEQUENCING LISTING, TABLE, OR COMPUTER PROGRAM CD

Non Applicable

BACKGROUND

Field of the Invention

The present invention relates a robotic vehicle type having autonomous drive logic, navigational control systems, and phone voice command with satellite telecommunication which manage and navigate the inner-motorized robotic omniwheels comprising multi-directional steering, extension and lift actuation.

BACKGROUND OF THE INVENTION

Related Art for Comparability

Prior art history discuses motorized casters employing in-wheel motor cam and various differential wheeled assemblies which change its direction by varying the relative rate of rotation of its wheels and movement is based on two separately driven wheels placed on either side of the frame axis or on the external body. Prior art cited discuss Mecanum wheels that moves omni directional by alternating wheels with left and right-handed rollers, so that each wheel applies force roughly at right angles to the diagonal the wheel is on the present robotic omniwheel vehicle works differently. An omni-wheel is inner motorized and controlled by the same principle as that of autonomous drive logic with onboard PC microprocessors for navigation, laser Radar and GPS range finding for vehicle location and obstacle avoidance.

The present robotic omniwheel vehicle can travel multidirectional to move about in tight spaces and over ruff terrain and has novel design to travel in a desired omni-directional manner to spin completely around traveling at a low speed for transverse industrial work, and the omnicart or omnivehicle can drive on a predetermined path or drive off a path to dock, also travel in reverse. The omnicart or omnivehicle can drive at accelerated high velocity speeds whilst traveling forward and reverse. A robotic omnicart or omnivehicle omniwheel comprise omni yoke assemblies with a rocking arm that swivels to steer while extending outward and retracting inward. The omniwheel rotates completely around as the robotic universal joint armature actuates and pivots thus raising the chassis up and down. The omniwheel chassis supports the universal joint's transmission rod which extends in upward and in downward positions allowing the chassis to be supported and prevent tipping, to thus agilely rock, fore and aft, side to side and diagonally. Thus the robotic omniwheel vehicle can transport a passenger or load in any given manner and can travel on and off road and on tracks or rails.

More specifically, the present embodiment is a novel robotic vehicle that utilizes autonomous navigation which is having touch screen control with a monitoring system, and as well by a phone device having voice command via satellite telecommunication onboard and cell phone voice control navigation, or controlled remotely which is to manage the omniwheels and the yoke assemblies which include motors with integrated gear reducers having user-friendly PC-based interface allowing a desired turning radius and to control accelerating velocity, and also to control slowing momentum and breaking. Related art cites do not discuss a robotic omniwheel having this method of autonomous yoke actuation which is to rock in multi-directions to help the chassis adjust when moving over uneven paths and off road.

Related art cites do not discuss a robotic vehicle comprising this kind of unique omniwheel yoke assembly comprising motorized gears which are calibrated to rotationally swivel at 0° to $360^8$ degrees to steer the omniwheel apparatus which is bolted on a frame base. The yoke's motorized universal joint and strut armature also has discoupled suspension and is hollow to indirectly house the sensors, lead wire, fuel lines and retractable cable for the motors and break components. The yoke also can utilize a motorized universal joint having a heavy duty for the rigours of industrial applications which can extend inward and outward as the robotic chassis steers by swiveling multidirectionally. Related art cites do not discuss robotic omniwheel vehicle with autonomously actuation that can raise and lower the robot chassis for added height and reach which is ideally suited for a wheelchair. Also, this method can allow adjustments for two robotic omniwheel vehicles to become connected while traveling in parallel by electromagnetic coupling devices which is a concept ideally suited for high speed railcars.

Related art cites do not discuss a robotic omniwheel vehicle having a novel design which contains at least one motor which is securely set inside the wheel shell cavity and support by internal and external axis rod, also containing two motors which are to spin freely if the secondary motor malfunctions. For a hybrid vehicle both fueled and electric motors are to work consecutively and furnish additional horsepower to drive on challenging roads. What's more, a vehicle operator controls traditional steering and by employing a navigational chairs with pivoting action helps to steer on point while traveling, plus this chair can raise upward.

SUMMARY OF THE INVENTION

The present invention is an inimitable robotic vehicle type having autonomous drive logic, navigational control systems with laser Radar, GPS, and phone voice command with satellite telecommunication which manage and navigate the inner-motorized robotic omniwheels comprising multi-directional steering, extension and lift actuation which can create new innovative opportunities to improve transportation technology while addressing a solution to travel more efficiently in any type of transportation vehicle to suit a child's toy, wheelchair, cart, automobile, truck, vehicles used for transit or railcar. The robotic omniwheel with a rocking arm swivels to steer adjusting to the terrain as the autonomous drive logic system plots the approaching course. The inner wheel contains the electric motor(s) or the fueled motor mounted inside the wheel shell cavity so that the motor(s) can be protected from outside element damage. The inner-motorized wheel is supported by a yoke device that is to steer the chassis, as well can the yoke can be coupled with a motorized universal joint designed to bear a heavy weight load which is to consecutively extend the omniwheels positions in a desired steering way and at the same time raise and lower the chassis with the assistance of a transmission rod.

The vehicle type's blueprint framework may have a desired design to travel in a desired manually steered method or travel in an autonomous method which both methods can drive in an omni-directional manner to spin completely around traveling at a low speed for transverse industrial work, and also to travel in reverse, and at accelerated high velocity speeds whilst traveling forward.

An omnivehicle type can include a desired chassis having parts and pieces, apparatus, devices and mechanisms adapting to a particular frame supporting a blueprint for any type of transportation form. The vehicle comprises a desired body design, size, material make with content comprising plastic, metal and carbon fiber, and also having desired cab contents, and also can include a motorized door, and a motorized canopy for access.

Accordingly the present omnivehicle type comprising omniwheels and drive logic with cell phone telecommunication voice control/command can create new innovative opportunities to improve transportation technology. More specifically, an omnivehicle operator can rotate on point along with the omnivehicle via a navigational control system and an omnichair device, and also a vehicle operator can employ an electromagnet coupler device which may be engaged to connect and to disconnect another omnivehicle having a similar electromagnet coupler device.

By removing a vehicle's superfluous parts like a combustion engine, transmission and related motor parts reduces vehicle weight which adds more interior space for necessary power system, and a computer control with drive logic and navigation components. The present robotic omniwheel vehicle can improve robotic transportation technology for vehicle types such as the ones illustrated; a child's toy, a cart, a wheelchair, an automobile, a truck, and other vehicle types used for shipping and railcar industry and other types not illustrated.

The robotic vehicle's omniwheel yoke assembly includes a drive logic controlled motor and may also use a gearbox which is to slowly swivel the omniwheel left to right at 0° radius or a desired degree which is to control the omniwheel's steering range ratios. The omniwheel's yoke device can indirectly couple with an optional motorized universal joint device comprising an electrical or a hydraulic mechanistic ability which is to vertically lift the vehicle chassis upwardly and back downward, and agilely rocks fore and aft, side to side and diagonally and also the universal joint's couples with a transmission rod framework allows the vehicle's chassis to raise up and down to agilely move about to transport an operator, a passenger, or a load in any given manner and follow a predetermined path.

The robotic vehicle's power system coordinates the inner-motorized omniwheel apparatus electric and fueled motors to consecutively work together and provide additional horsepower to drive on challenging roads and thus to safely transport an operator, a passenger and cargo in an omni directional and a unique manner. More so, the renewable energy power system utilizes electrical energy can plausibly be transportationally generated on board. Notably, the robotic vehicle and omniwheel assemblies are to include at least one electric in wheel motor, hub motor or at least one discoidal motor, or one fueled in wheel motor, a computer controlling system with program software, electronic and mechanistic components which can be purchased on the market and from the manufacturer.

BRIEF DISCRIPTION OF THE DRAWINGS

These and other objects and advantages of the present invention will become more fully apparent from the following detailed description when read in conjunction with the accompany drawings with like reference numerals indicating corresponding parts throughout.

FIG. 9 depicts transportation type for the omni-skate(s).

FIG. 10 depicts a side view of a transportation type for the omni-scooter.

Figure 13:
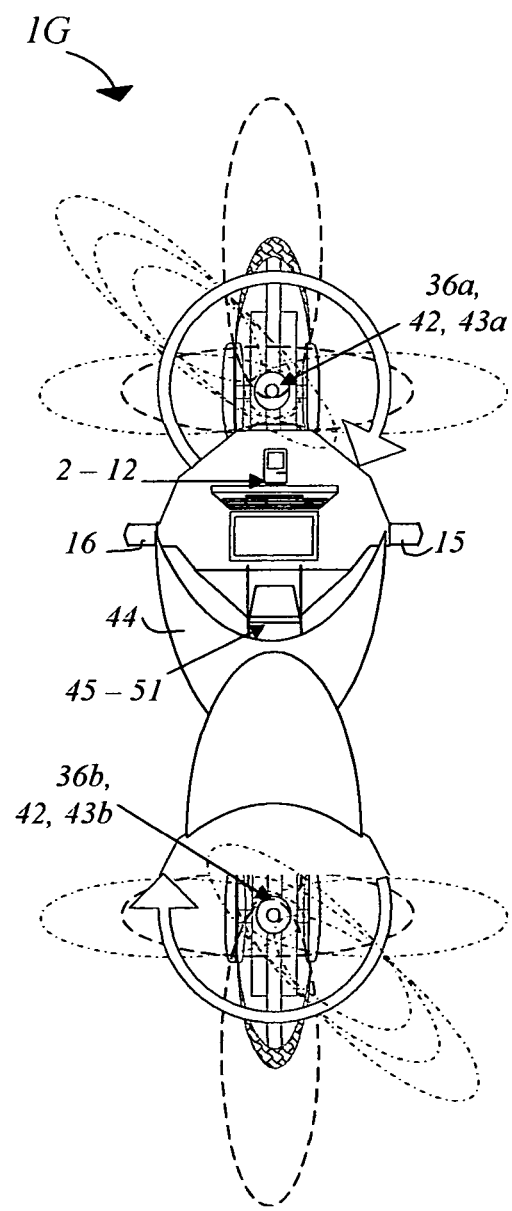

FIG. 13 a top view for the omni-motorcycle having desired rotation capability.

Figure 14A:
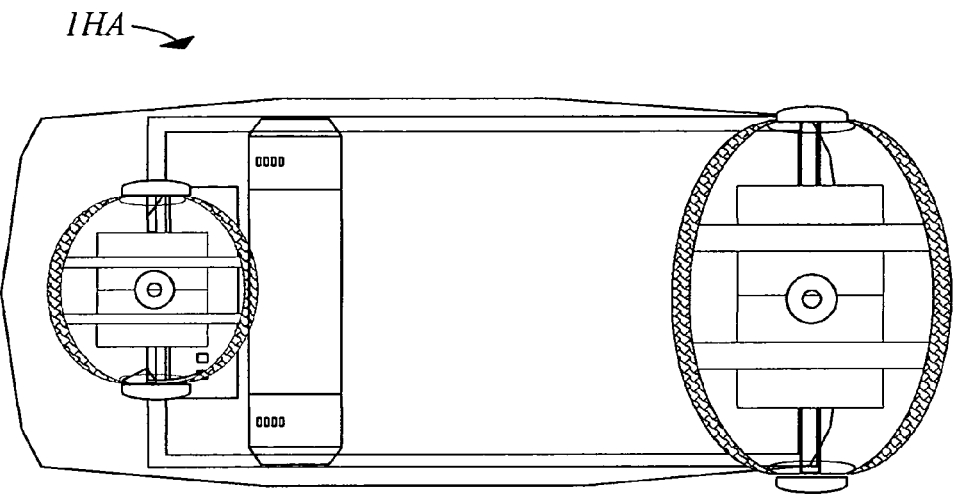
Figure 14B:
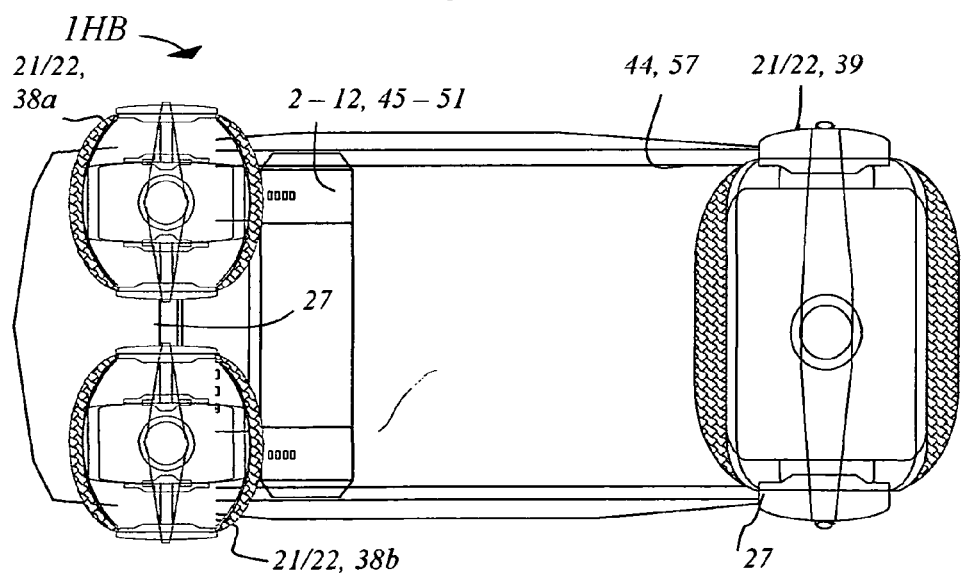

FIG. 14A depicts a view of a transportation type having one or two inner-motorized omniwheel apparatus, and FIG. 14B is a view of an omni-sport car.

FIG. 15 is a top illustrated view of a transportation type for a cart, or an omnivehicle type having four wheel drive, and showing the front pair of wheels turn opposite from the rear pair of wheels.

Figure 16:
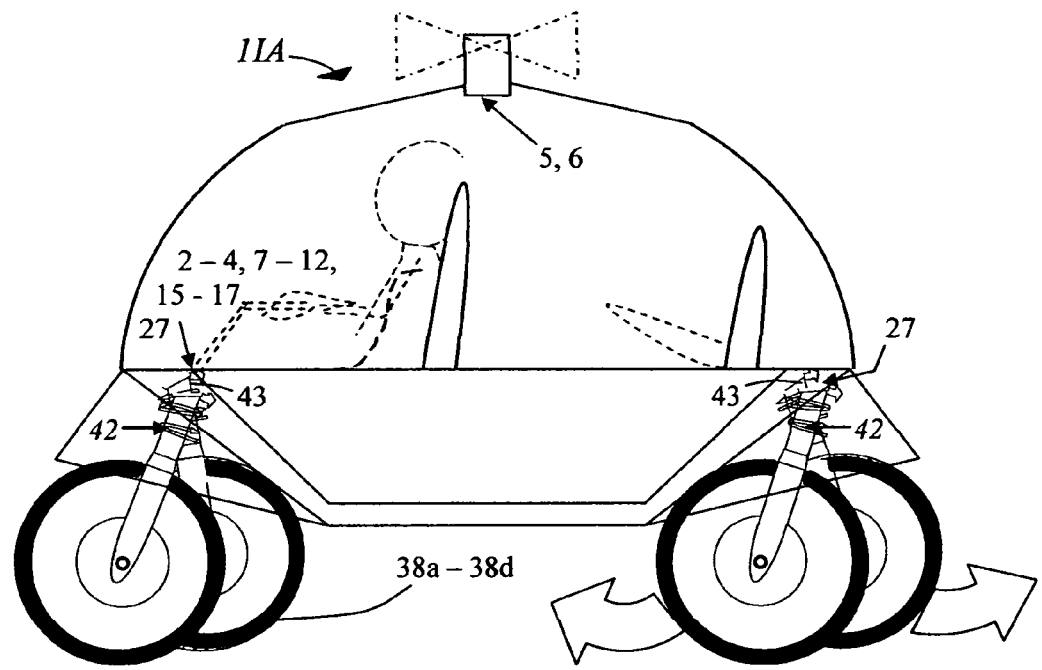

FIG. 16 is a side view for a transportation type sedan with a fixed omnichair having dash panel control.

Figure 17:
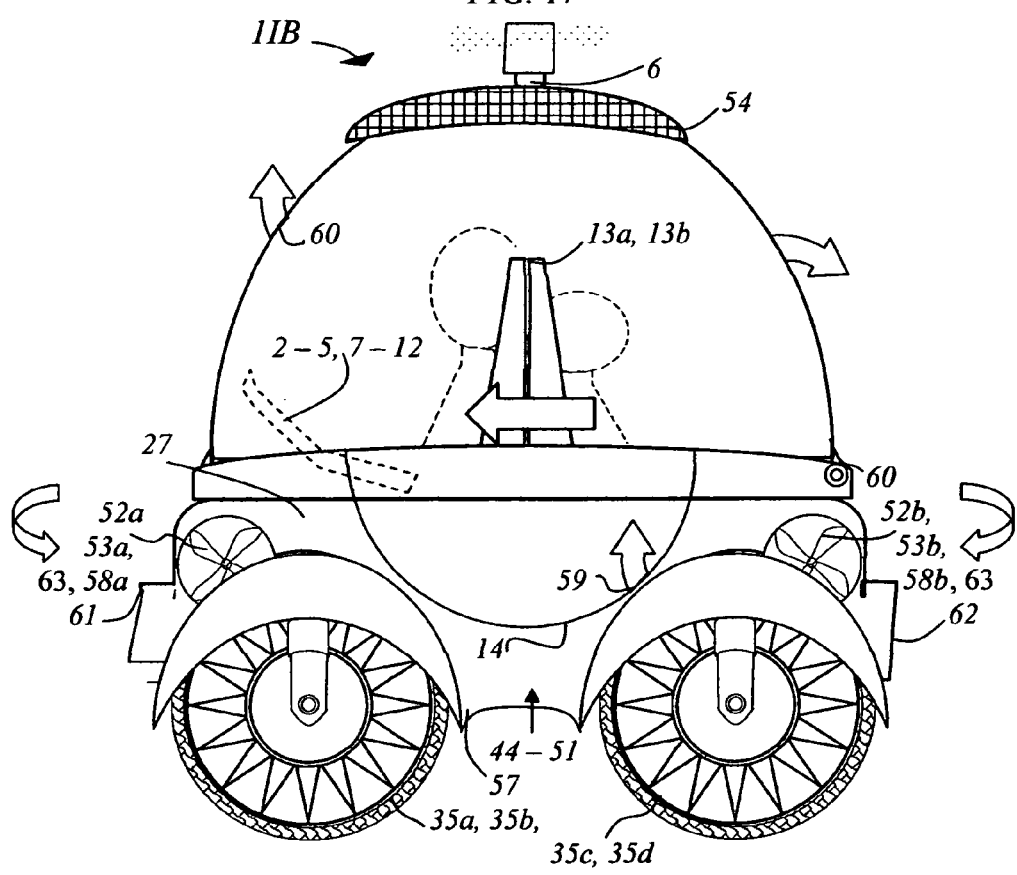

FIG. 17 illustration views of an omnivehicle type employing a navigation control system along with a navigational omnichair device to pivot on point.

Figure 18A:
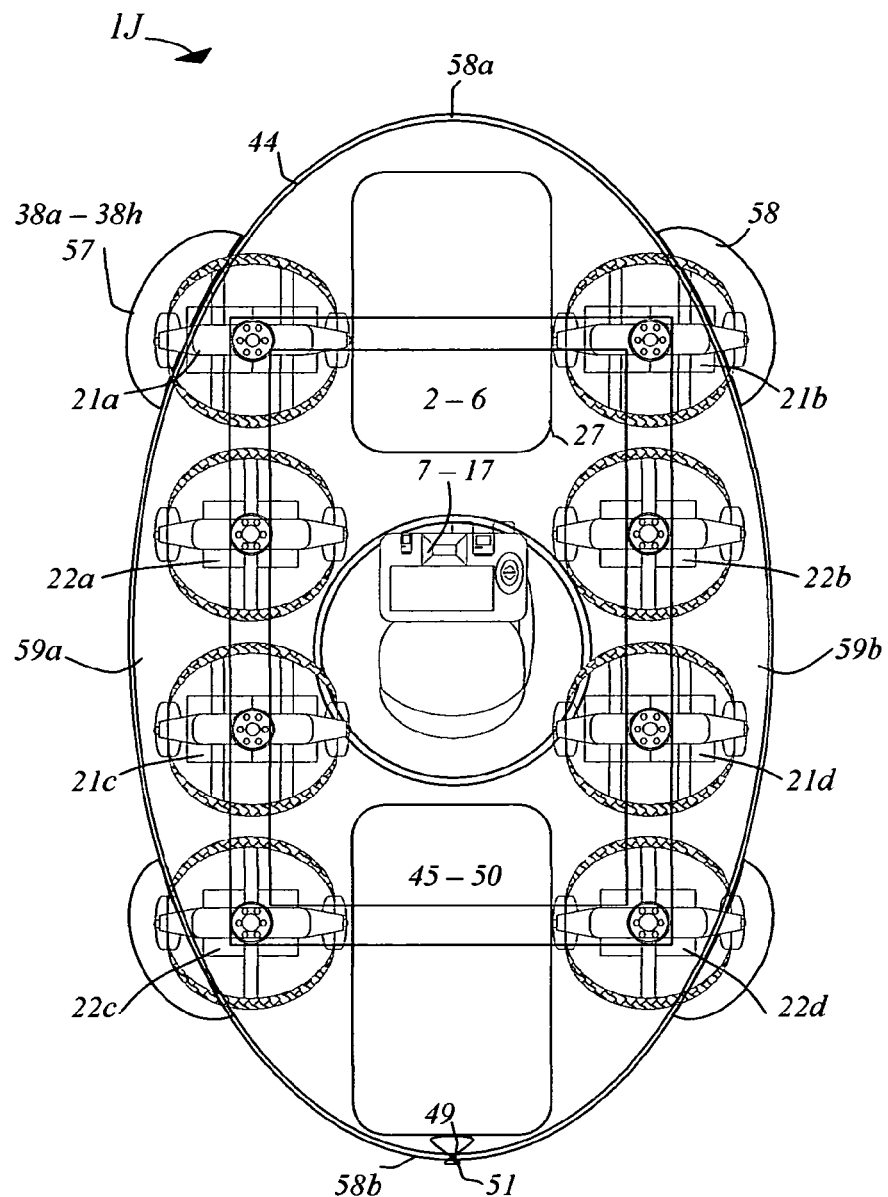
Figure 18A:
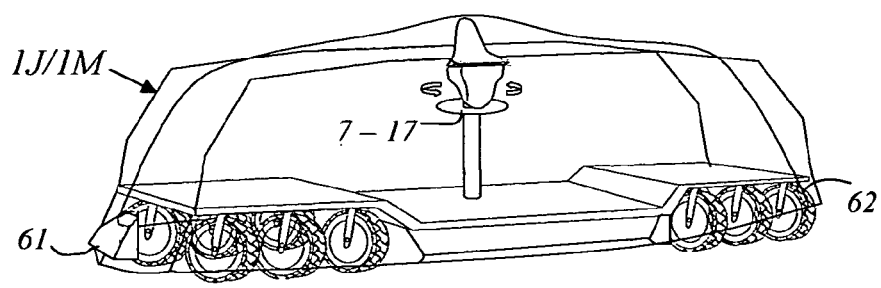

FIG. 18 is a top illustration view for a transportation type suited for a van or bus.

Figure 19:
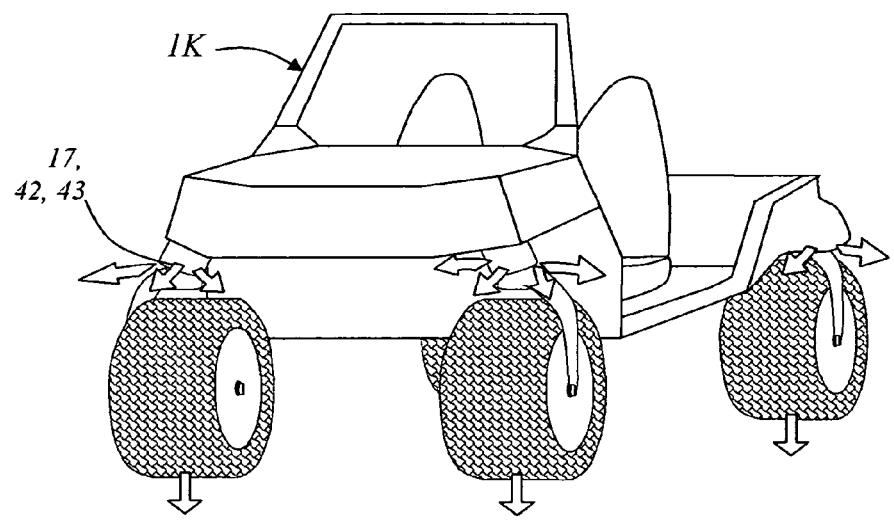

FIG. 19 is an angular depiction for a transportation type omnitruck or a heavy duty utility truck.

Figure 20:
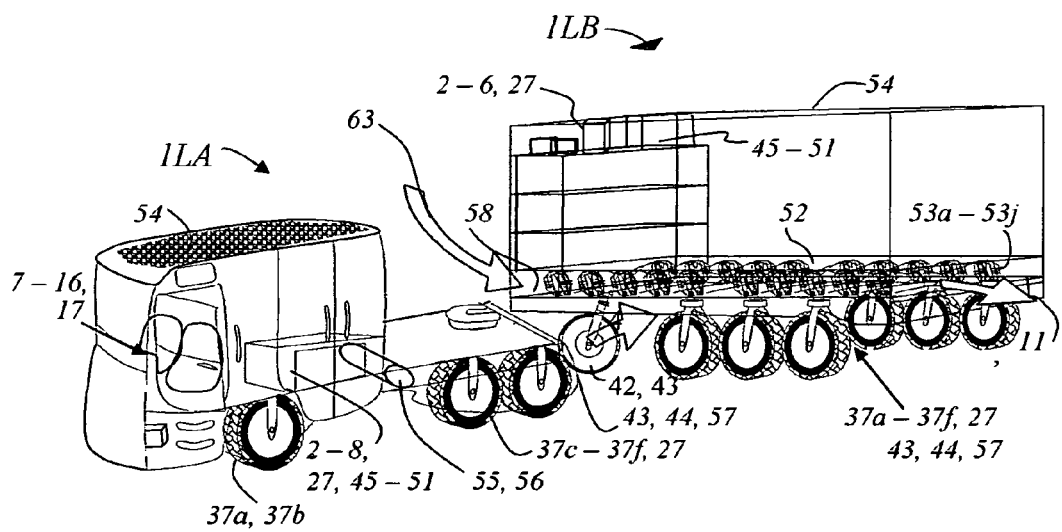

FIG. 20 is a side illustration of a transportation type semi truck and trailer.

Figure 21:
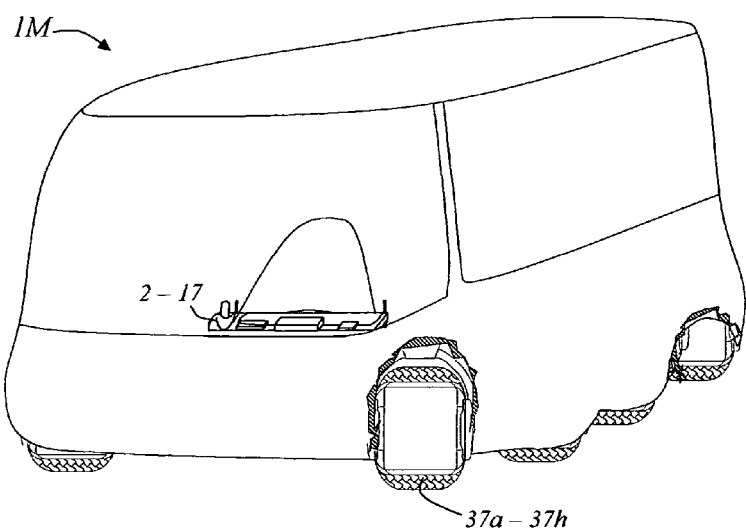

FIG. 21 is a side depiction of a transportation type for multiple occupants.

Figure 22:
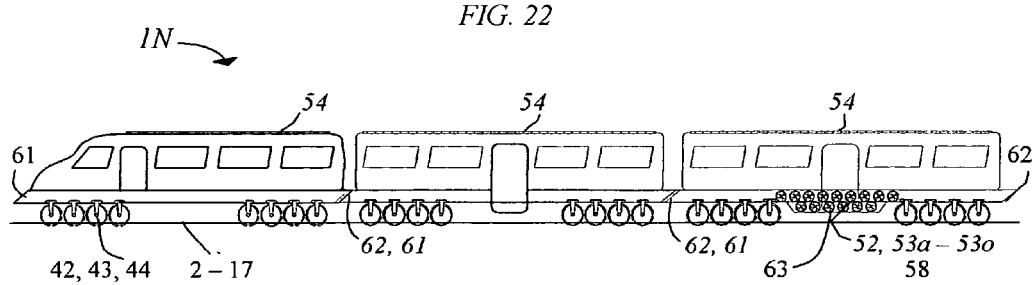

FIG. 22 is a side depiction of a transportation type for mass transit vehicles which can include electromagnet coupler devices and renewable power system.

DETAILED DISCRIPTION OF THE PREFERRED EMBODIMENTS

Hereinafter, a robotic omniwheel vehicle having inner-motorized omniwheel apparatus and method of control will be described in details with reference to the drawings and assigned the same reference numbers.

Figure 1:
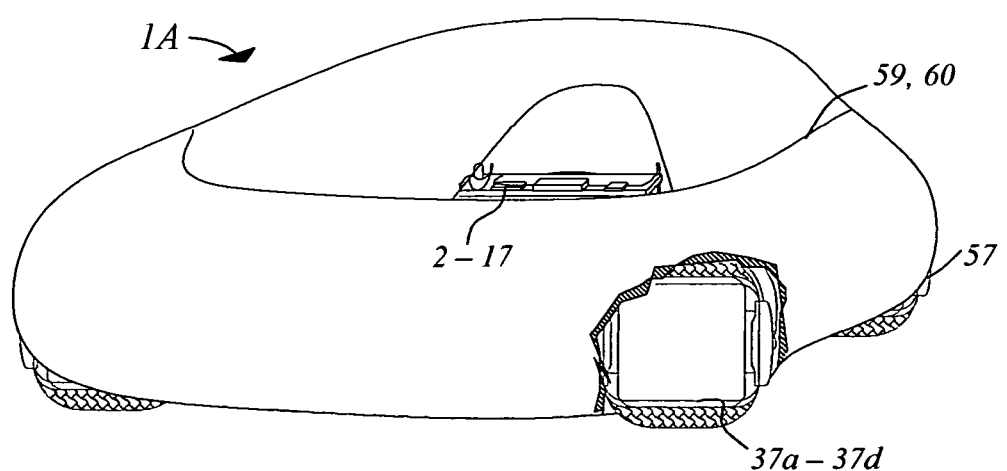
FIG. 1 depicts a front angular illustration of a vehicle mode type that can include desired contents and have a desired design, size, make and vehicle chassis, and showing a cut through view of the inner-motorized omniwheel apparatus.

Referring now in greater detail FIG. 1 shows a depiction of a robotic omniwheel vehicle 1A employing a plurality of inner-motorized omniwheel apparatus 37a-37d, and vehicle chassis can include CPU and navigational control systems 2-14 to thus transport the vehicle operator, and passenger(s) in any given manner, or swivel completely around for fun.

Figure 2A:
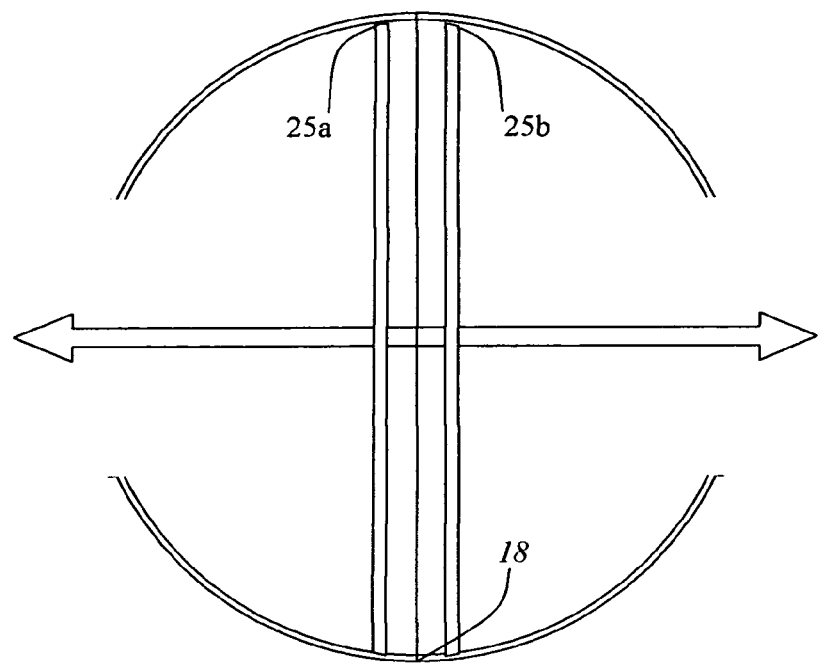
FIG. 2 is a front cut through view showing the practically assembled inner-motorized wheel device having a double opening.
Figure 2A:
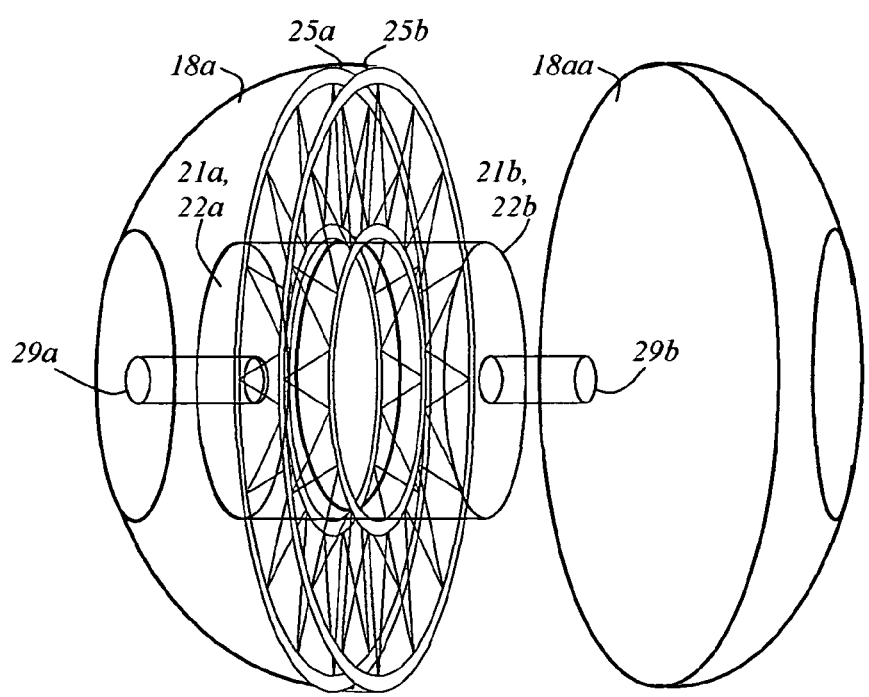

Referring now in greater detail FIG. 2 a wheel having a single or a double opening with a desired wheel shell assemblage design that accommodates wherein, at least one electric motor device 22, or a fueled motor device 21. The omniwheel assemblies motor type and hub assemblies can be purchased on the market and comprise a preferred stator, rotor and axle design, thus axle rods 23a, 23b, 29a and 29b, and wiring 50a, 50b, or fuel lines 56a, 56b. The omniwheel is to have a protective surface covering. The motor when powered off or is malfunctioning is to spin freely thus allowing the other inner-motorized omniwheel groups to operate and carry on and thus preventing break down.

Figure 3:
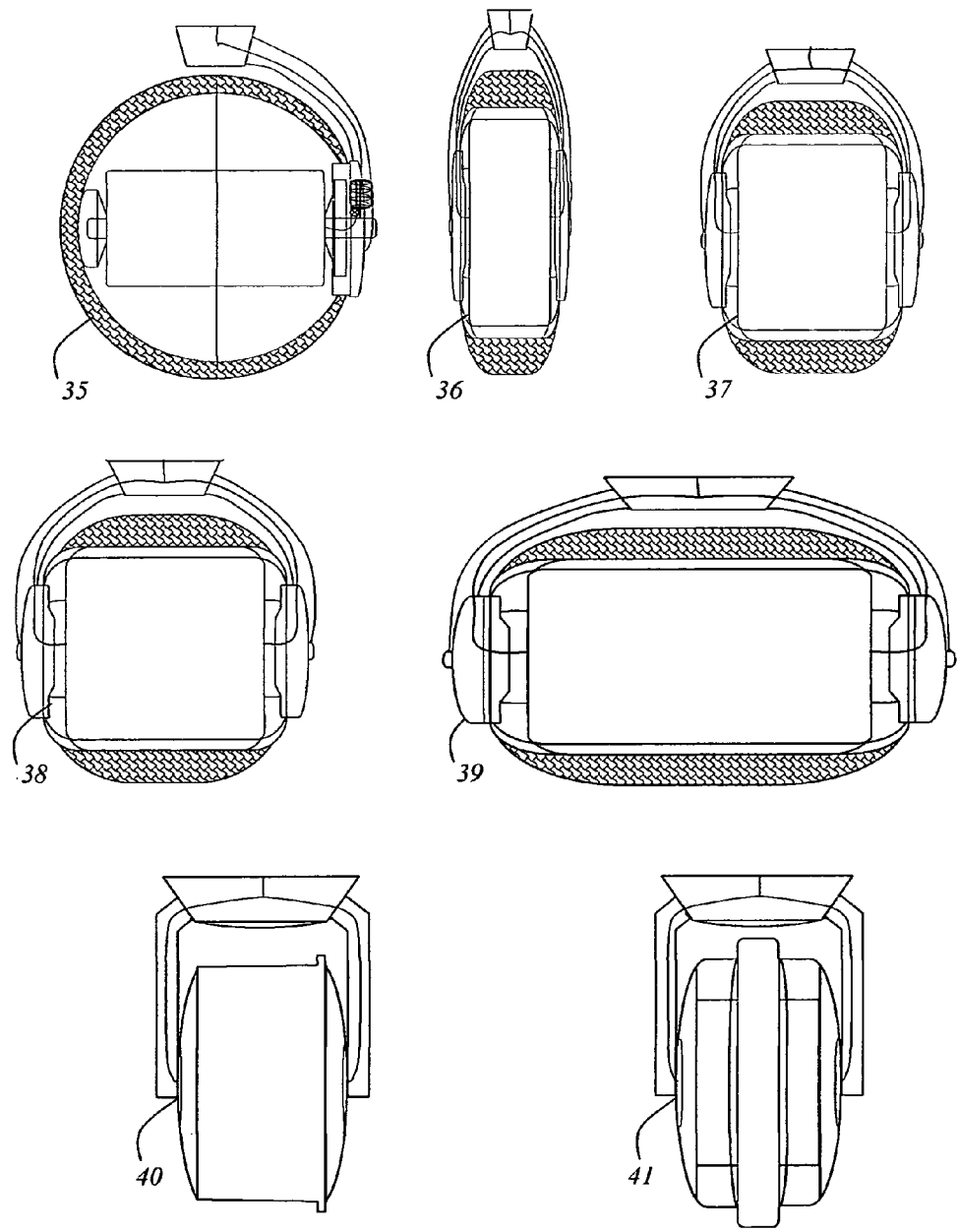
FIG. 3 is a top illustration and with a cut through view showing four various omniwheel device types.

Referring now in greater detail is FIG. 3 is showing various wheel shape depictions of a single armature inner-motorized omniwheel apparatus comprising a sphere wheel shape 35, having narrow to wide wheel shapes, or having a double armature design having a narrow wheel shape 36, or a wide wheel shape 37, or a sphere wheel shape 38, or a cylinder wheel shape 39, or a rail wheel shape 40, or a rail wheel shape 41.

Figure 4:
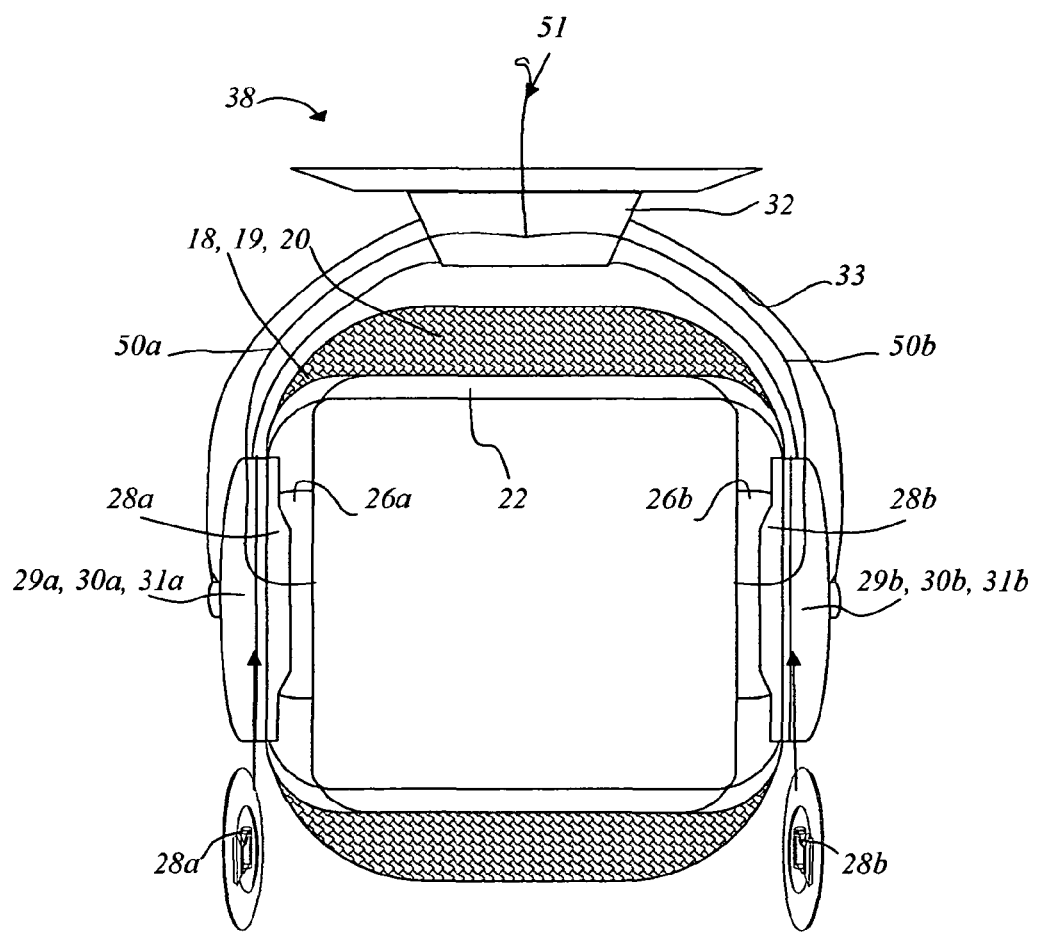
FIG. 4 is a front view depiction of a double armature yoke device supporting an assembled inner-motorized wheel device having wheel device having a double opening with two break device assemblies.

Referring now in greater detail FIG. 4 is a double armature inner-motorized omniwheel apparatus which includes wheel shell piece 18, wide 37, with an inflated tire 19, an electric motor device 22, or a fueled motor device 21, thusly supported wherein by a pairing of axle rods 23a and 23b and 29a and 29b housing both wires 50a, 50b, or fuel lines 56a, 56b, and secured with a bracket couplings 26a and 26b, stator brackets 38a and 38b and rotor brackets 25a and 25b which can be securely fixed onto the outer shell openings and/or inner peripheral rim surface 18a and 18b thus when the motor is powered on the rotor wheel and brackets apply rotational torque to crank the axle rods 23 within, thus the wheel assembly spins until break device's 28a and 28b apply pressure on the rotor wheel or bracket surface stopping spinning momentum.

A break device 28 may comprise electronics or hydraulics and can be housed securely inside the hub assemblage 30 and may allow ventilation.

The hub assemblages 30 are lug bolted 31 to securely interconnect the omniwheel assemblies together. The swiveling yoke device 32 includes a controller, a yoke motor device with an actuation device which can be a gear box or be hydraulic which is to laterally revolve around to a desired degree, and may include a strut armature 33 with a hollow shaft to allow optional shock absorption via device 34 wherein to indirectly house the power cable harness and hard wiring 50 for sensor array and USB cable 51, and allowing access for fuel lines 55, and also is to furnish controlled fuel power to the yoke motor device.

The yoke assembly is to slowly swivel left to right or completely rotate up to 360° which controls a fully assembled inner-motorized omniwheel apparatus steering. The yoke's motor is to control rotational momentum therein and to slow down and stop as break pressure is applied. To support vehicle weight load the yoke can also include an optional motorized universal joint 43 with transmission rod mechanism 42 comprising an actuation motor device which can have an electrical or a hydraulic design which is to support the robotic vehicle's chassis.

The motorized universal joint works by extending the omniwheel assembly outwardly and back inwardly, and to rise up and lower back down and thus pivot sideways fore and aft as the omniwheel is rotationally steering.

The control system 5 is to monitor the operation process relayed from the sensor array 27 which are indirectly assigned within the omniwheel assemblies to monitor operational status. The omniwheel's motor and the yoke device motor shall spin freely when powered on, or when abruptly turned off thus allowing working motorized omniwheels to continue revolving to steer and move onward.

Figure 5:
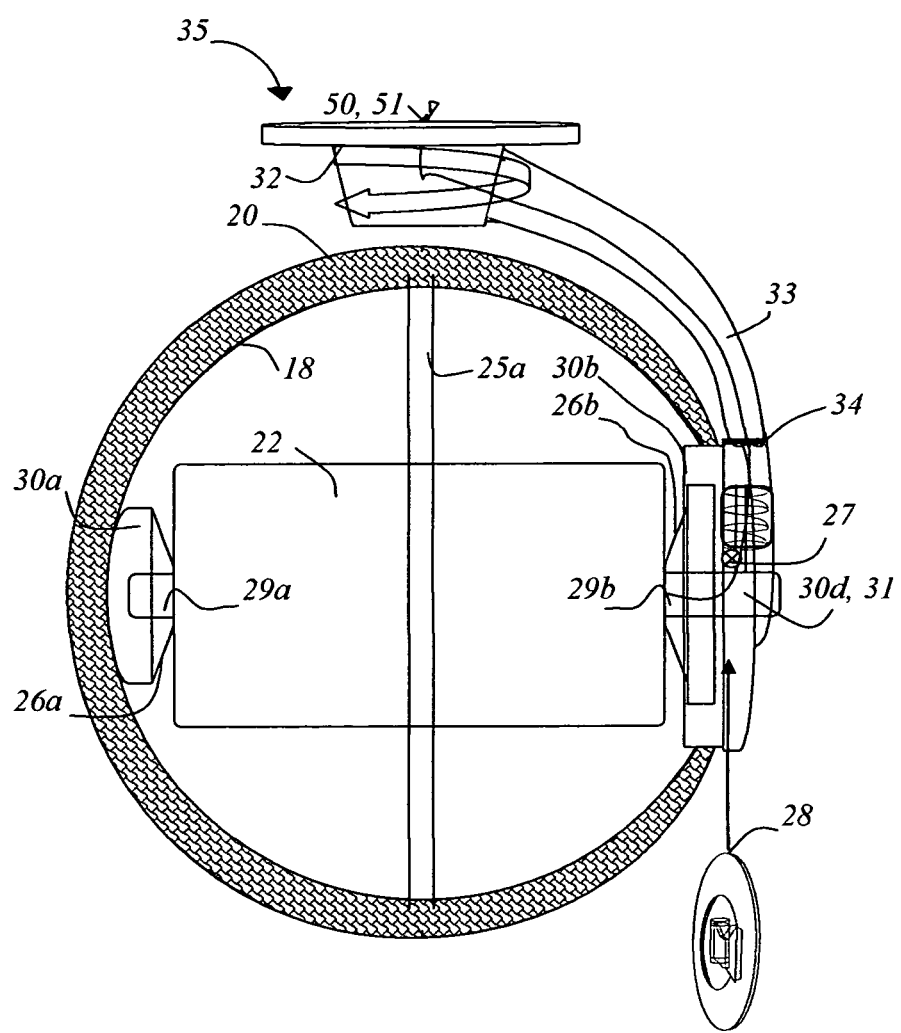
FIG. 5 is a front view depiction of a single armature yoke device supporting an assembled inner-motorized wheel device having wheel device having a single opening with one break device assembly.

Referring now in greater detail FIG. 5 a single armature inner-motorized omniwheel apparatus 35 having a desired wheel shape can include a wheel shell piece 18 having a tire with tread surface 19, and shown therein to accommodate at least one fueled motor device 21 or electric motor device 22. The wheel assemblage includes therein a stator device 24 and rotor part 25a, and rotor brackets 25b and 25c that couple with a hollow hub axle rod 23 which houses a power lead wire and fuel line to access a motor type 21, or 22 and a break device 28. The stator bracket coupling 26 remains fixed as the rod 29a coupled to the rotor bracket 25a which fastens onto the wheels inner chamber surface or the wheels rim bracket in a desired manner. The strut 33 may or may not include therein a discoupled air spring device 34 as a shock absorbing contrivance.

Figure 6A:
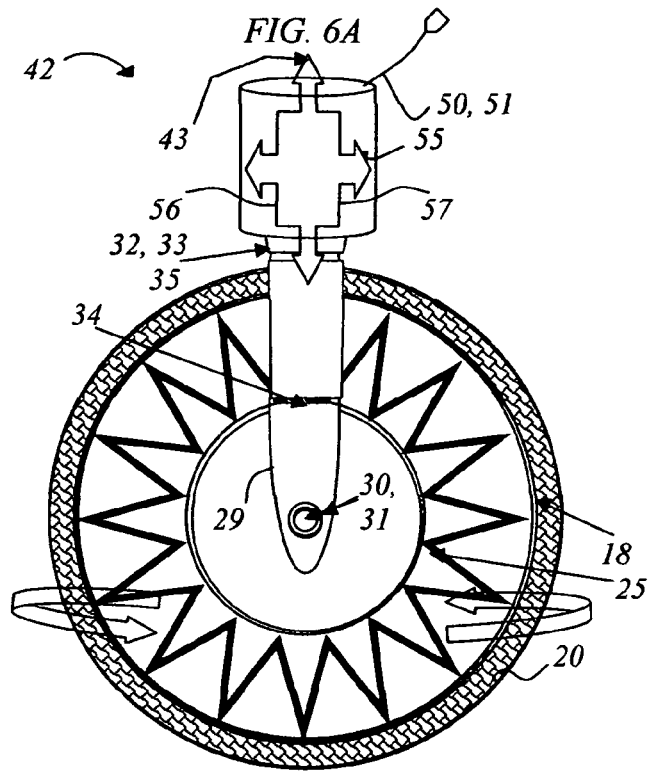
FIG. 6 depicts a side perspective view of an inner-motorized omniwheel apparatus with the universal joint device.

Referring now in greater detail FIG. 6A is a fully assembled robotic vehicle omniwheel comprising motor and hub assemblies which are supported by a yoke device that is to steer the omniwheel at 0° to 360°degrees, and it is to raise and lower the chassis consecutively extend an omniwheel outward and inward.

The inner-motorized omniwheel apparatus wheel shell shape 46 is having a tire with tread surface, and can utilizes a single or a double arm supporting a preferred wheel type and shape having a tire with tread surface 18, 20 and comprises a yoke device 34 including a hollow shaft 33, and having a yoke controller 55, a yoke motor 56, and a yoke gear box 57, and yoke suspension strut 34.

The yoke is to support the chassis 44 and can couple with the optional motorized universal joint 43. The universal joint 43 comprises within a transmission rod 42 which couples to the chassis 44 allowing the universal joint 43 device to uniquely actuate and engage lift and expansion as arrows show.

Figure 6B:
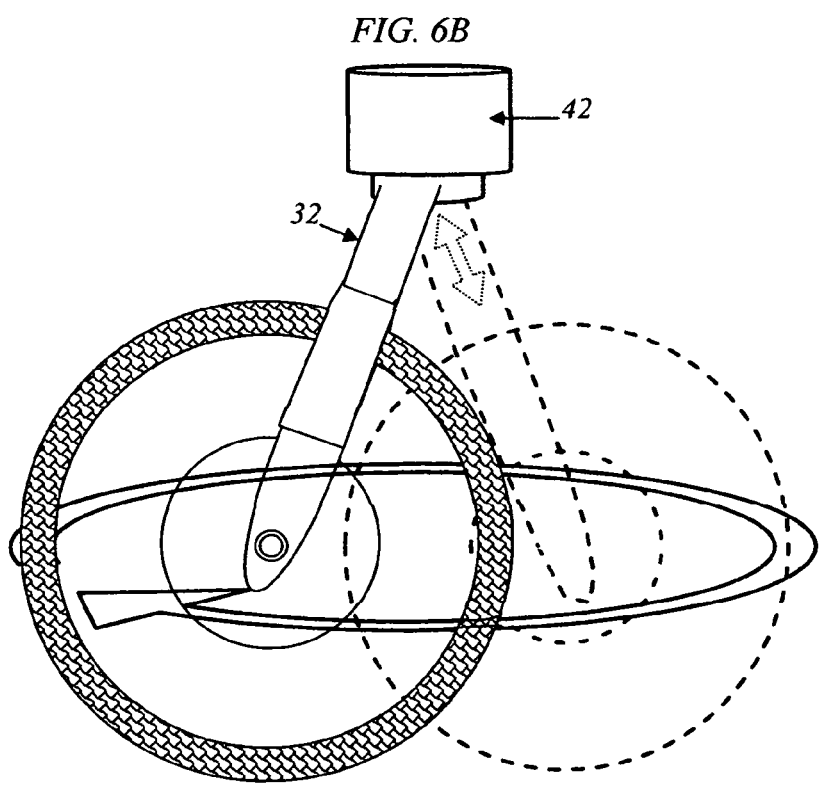

FIG. 6B shows the universal joint 43 and transmission rod 42 dotted line depicting the suspending motion to thus rise up and lower down, and to also show the unique multi/omni-directional steering range by the dotted line omniwheel assembly moving outwardly and back inwardly, and also pivoting sideways fore and aft as shown by various directional arrows.

Figure 7:
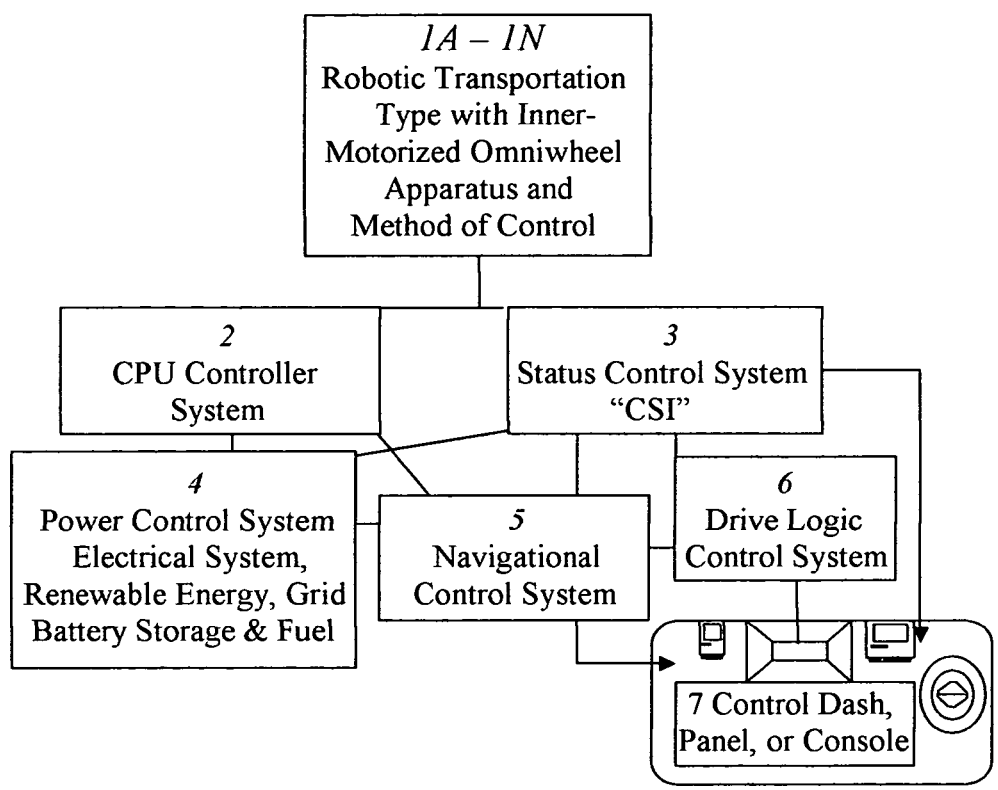
FIG. 7 depicts a block diagram for multiple control systems which corresponds data to an omnivehicle operator.

Referring now in greater detail FIG. 7 a robotic omniwheel vehicle includes a CPU computer control system 2 and microprocessors which receive and transmit communications, and a Status Control System 3 with Capability Statistics Indices or "CSI," that define the degree to which the process is or is not meeting task, and also a Power Control System 4 which is employed to invert AC voltage to DC voltage and vice versa DC voltage to AC voltage and thus transfer voltage via the electrical system, also a Navigational Control System 5 comprising control devices such as a Drive Logic Control System 6 with monitoring components, laser and radar, and GPS. A CPU computer control system 2 communicates by CSI via hard wire and USB lead wire and cable plug to thus connect with computer software with drive logic programming, also by cellular phone voice command and drive logic application to control navigation which are to manage the omniwheel and the vehicle's chassis power systems.

A power control system 4 electrical processor systematically maintains a constant charge to a primary battery 45 and also to a secondary battery 46 and furnishes voltage to the electric motors and to the vehicle's electrical components. The battery's can also be charged by On/Off Grid System 49 via utility grid power or a renewable energy power system.

The renewable energy power system which utilizes electrical energy that can plausibly be transportationally generated to provide surplus battery power for on board components or for off board components.

The On/Off Grid System 49 may send unspent electrical energy voltage back to the grid utility company to generate revenue or dump load to surplus power for emergency application needs.

The CPU, CSI, and power control systems manage the navigational control system 5 to regulate voltage power levels and fuel levels to the vehicles inner wheel motors, and to the yoke assemblies. The yoke device controller is to manage and monitor steering and pivoting range operations by the inner-motorized omniwheel and the yoke assemblies via a preferred method. The CPU system 2, CSI system manages and monitors navigation operations while in route, thus when employed automatically takes over to drive and navigate the vehicle type.

Furthermore when in route automatically take over to drive, navigate and as well automatically manage a navigational omnichair device 13 having an electric or hydraulic chair lift device 14. Also when employed automatically takes over to drive and navigate and assists vehicle operator to navigate the connection between two vehicles while in route via a front electromagnetic coupler device 61, and a rear electromagnetic coupler device 62.

Figure 8A:
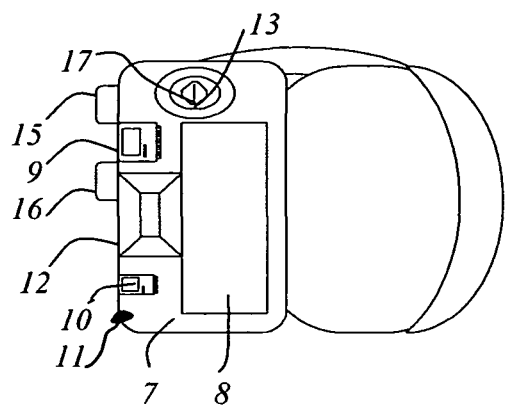
FIG. 8A-FIG. 8C is a top view and a side perspective of a navigational omnichair device having swivel capabilities and a dash panel control device.
Figure 8B:
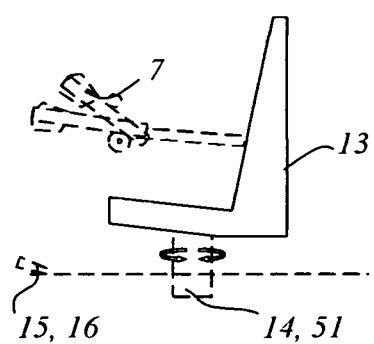
Figure 8C:
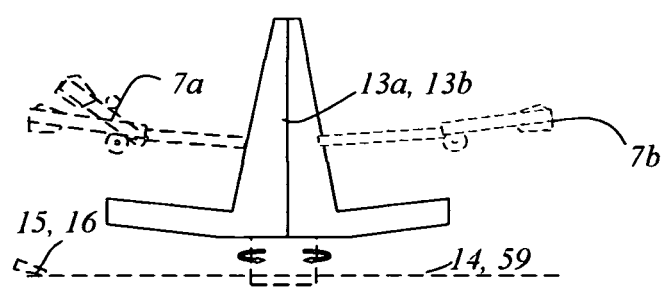

Referring now in greater detail as shown in FIG. 8a-FIG. 8C the navigational control system 5 allows a robotic omniwheel vehicle operator to navigate and travel in an omni direction manner via a navigational omnichair 13 which may include the following device's such as a computerized dash panel 7, or a computer console 7 with optional touch screen monitor device 8 with gauges, and a wireless remote control device with port charger 9, and a voice control phone device 10, at least one air bag 12. The operator may utilize a detachable hand held control panel 11 as depicted to operate vehicle from a far. The monitoring device 8 may include touch screen display and gauges.

The navigational omnichair may include a circular rotating floorboard device 14 which is to pivot on a rail that can comprise bearings. The omnichair's rotational floorboard device 14 comprises therein; a motor device, a gear box, and power cable 50, retractable USB and power cables 51, and/or hydraulic fuel lines 55. The omnivehicle operator can be secured in the navigational omnichair 13 and enable the hydraulics transmission rod to rise up and lower down to a desired height and slowly rotates on axis $0^8$ to $360°$, and may also include a break pedal 15 and a throttle pedal 16 for common driving and navigation, and as well add secondary passenger seats 13b.

Referring now in greater detail FIG. 9 depicts a pairing of omniskates 1B employing a plurality of electric inner-motorized omniwheel apparatus 22, 39a-39b, and chassis 44 comprising a desired design that has a prospective design to perhaps enable a motor with sufficient torque and horsepower to carry a passenger or load and thusly travel. The assemblage may employ a primary control system 2, an electrical and power control system 4, and a wireless remote control device and a port charger 9, wireless control, and voice command activation via a desired phone device 10.

The skate pairing is a means of transportation type for a robotic omniwheeled vehicle can be powered by at least one pre-charged battery having a desire voltage and with a recharged battery compartment therein the framework 44 houses battery storage compartments 48 connections with a primary battery system 45, and a secondary battery system 46, a battery charging device 47, an On/Off Grid System 49 and power cable 50, and retractable USB cord 51, and two flexible rubberized fenders 57a, 57b to break.

Referring now in greater detail FIG. 10 is an omni-scooter 1C employing a plurality of inner-motorized omniwheel apparatus 38a-38d, and lifting device 43a-43d transmission rod, and comprise a desired chassis frame 44, body 57 design comprising an extended scooter handle to steer and break 15, 17, 63, and may employ wireless remote controller 9, or voice control phone device 10, or a detachable control panel 11 which can be hand held, and a battery array, and a battery compartment charger, and power cable 45-51.

Figure 11:
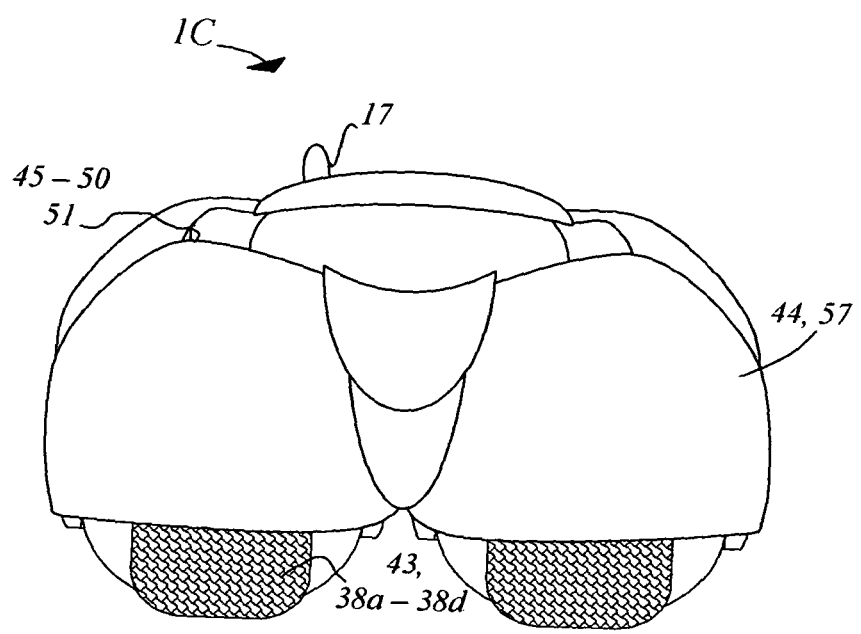
FIG. 11 is a front illustrated view for a child's toy or an off road omni-vehicle with a joystick controller.

Referring now in greater detail FIG. 11A depicts a transportation type 1D a four wheeled omnivehicle suiting a child's toy which may employ a four inner-motorized omniwheel apparatus 38a-38d, and employ joystick device or steering wheel option 17 control safe electric motor speed and break and also include a grid charged battery 45-51 system, and may include a pivoting steering console 17 not shown, and may include grip break 15 and grip throttle 16 not shown, and may employ CPU control system 2, a status control system 3, a power control system 4 with an optional renewable energy power system, and a navigation control 5 with GPS 6 locator guides for rural travel, and also with a durable chassis framework 43, 44, and body and fenders 57 designed for rugged on and off road conditions.

Figure 12A:
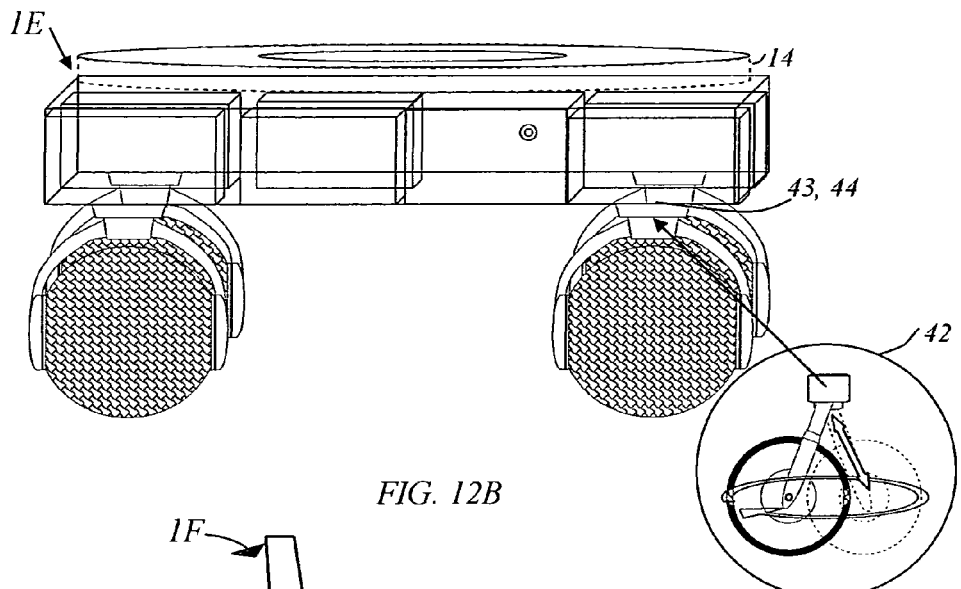
FIG. 12 is a side view for a transportation type omni-wheelchair.
Figure 12B:
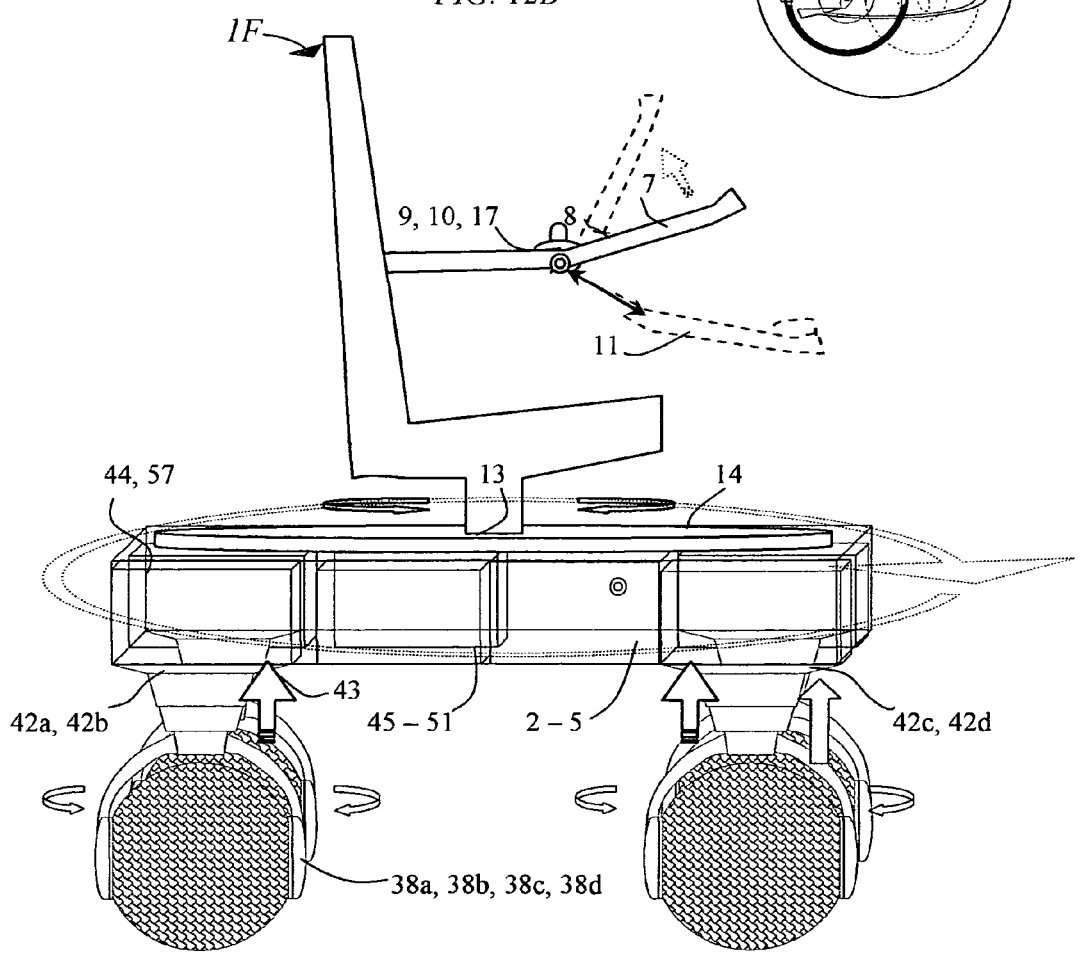

Referring now in greater detail FIG. 12 depicts a transportation 1E cart base having desired rotation capability to carry equipment and cargo, and/or passenger(s) thus chassis frame 44 and protective body 57 may be raised and stabilized by the motorized universal joint mechanism 42a-42d and the transmission rod 43 to lift base up and down, and employ at least four inner-motorized omniwheel apparatus 38a-38d, and employ control systems 2-11 and may control cart base from a distance, and include at least one primary battery 45 and secondary battery 46, and charger 47 with battery storage compartment 48, and employ On/Off Grid System 49, power cable 50 and retractable USB and power cord 51 and may include revolving pedestal 14.

FIG. 12 a transportation type 1F omni-wheelchair may comprise the contents as discussed in scooter 1C, and 1E cart base, and employ navigational control systems 7, 8, 9, 10 with detachable control panel 11, omnichair 13 with rotational floorboard 14, and may include joystick control 17 or a toggle which controls the omniwheel's steering and also the acceleration throttle.

The cellular phone can be hands free to navigate the omni-wheelchair by telecommunication voice command.

The cell phone plugs into the control panel via a USB port with charger, allowing the control panel to also have satellite voice control and touch screen control to navigation the omni-wheelchair.

The omni-wheelchair CSI system modes work to stabilize the rocking and tipping by autonomously raising up or lowering down or comprises a transmission rod 42 and located inside the universal joint device 43 which can actuate omniwheel rotation when lifting and also when extending thusly suspending chassis frame 44 as the arrows show various CSI system's synchronized actuating commands for outward/inward motion and side to side motion also lift up and lower down.

Referring now in greater detail FIG. 13 depicts a transportation type 1G robotic motorcycle employing front inner-motorized omniwheel apparatus 36a, and a rear inner-motorized omniwheel apparatus 36b having desired rotation capability, and may employ a fueled motor device 21 with fuel line 55 and fuel tank 56 or an electric motor device 22, and an electric or hydraulic extension device 42 with transmission rod front 43a and rear 43b to raise and extend fore and aft or raise and lower the chassis frame 44, and body with fenders 57 and as well, may employ computer control system 2, a status control system 3, an electrical and power control system 4, a navigational control system 5, a drive logic with radar and GPS system 6, a control panel or a control console 7 with a monitoring touch screen 8, a foot pedal break 15, a hand grip throttle 16, and a handle bar steering device.

The turning radius depends on the vehicle design, and also at least one primary battery 45, a secondary battery 46, a battery charging device 47, a battery storage compartment 48, an On/Off Grid System 49, a power cable 50 and retractable USB power cord 51.

Preferably, additional omniwheels make the motorcycle a three or four wheeler.

Referring now in greater detail FIG. 14A is a bottom view of a transportation type 1H sports car having one front inner-motorized omniwheel apparatus 38a, 38b, and a inner-motorized omniwheel apparatus 39 with an oval shape which can employ optional motor types 21, or 22, and sensor 27 array are placed throughout chassis framework 44, at including at least one primary battery 45 and secondary battery(s) 46, and battery charging device 47, a battery storage compartment 48, and On/Off Grid System 49, and power cable 50, retractable USB power cord 51.

FIG. 14B is a side view of same vehicle type 1H sports car with two front omniwheels and optional manual steering wheel, and rear cylinder wheel 39 is design with a cylinder shaped omniwheel having limited swiveling range that is suited for sand, snow and off road applications.

Figure 15A:
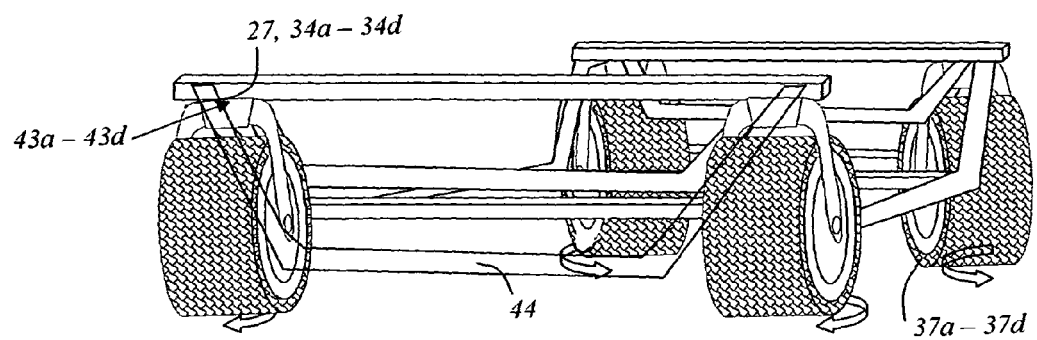
Figure 15B:
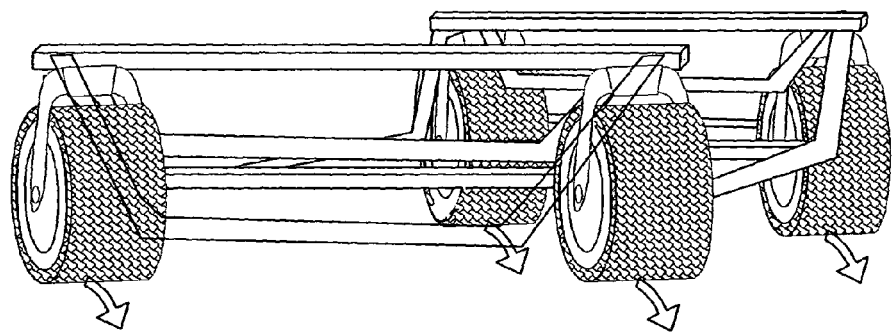
Figure 15C:
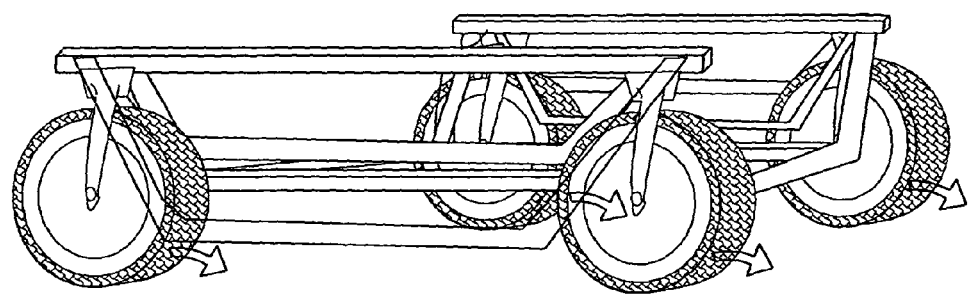

Referring now in greater detail depictions FIG. 15A-15C desired chassis frame 44 with wiring 50 and USB cable 51, and can include built-in suspension 34, 43, and also sensor array 27 which is to be placed where preferred;

FIG. 15A depicts two front inner-motorized omniwheel apparatus 37a and 37b turning opposite of the two rear inner-motorized omniwheel apparatus 37c and 37d, FIG. 15B showing four synchronized inner-motorized omniwheel apparatus 37a-37d steering diagonally at approximately 45°, and FIG. 15C shows four synchronized inner-motorized omniwheel apparatus 37a-37d steering sideward at 90° and 0° to 360° range of rotation pertaining to the omnivehicle's design.

Referring now in greater detail FIG. 17 depicts a fully assembled transportation type 1I sedan employing four inner-motorized omniwheel apparatus 35a-35d, and CPU computer control system navigational control system devices 5,6 also 2-4, 7-12, 27, and omniwheel array 43 shown actuating and can also use navigational joystick device to control speed along with omnichair device with joystick controller 12.

Referring now in greater detail FIG. 16 depicts a transportation type 1I sedan employing four inner-motorized omniwheel apparatus 35a-35d, and employ CPU computer control system 2, and sensor status array 27, and electrical and power control system 4, and also may include navigational control system 5 having a variety of devices 6-14. The vehicle chassis framework houses 44 and lead wiring connecting with primary battery system 45, and secondary battery system 46, battery charging device 47, battery storage compartment 48, On/Off Grid System 49, power cable 50 and with a retractable USB with power cord 51, plus a front and rear wind turbine housing 52a and 52b, two wind turbines 53a, 53b operate while in tow 63, body fender 57 and air flow vents 58, and a solar power device 54 coupled to vehicle roof and a motorized door 59 which opens upward as arrows show with the motorized hard top 60 having a see through canopy which also shows chair, an electromagnetic coupler device front 61, and rear 62 to couple with another vehicle employing an electromagnetic coupler device.

Referring now in greater detail FIG. 18A depicts a hybrid omnivehicle 1J van employing a plurality of inner-motorized omniwheel apparatus 38a-38d groups employing a fueled motor 21a-21d therein and a plurality of inner-motorized omniwheel apparatus 38e-38h groups employing a electric motors 22a-22d therein the omniwheel group work consecutively to meet a hybrid vehicle's navigational task which is providing additional horsepower when needed to drive up steep hills and on challenging road conditions, thus one group 21a-21d is on/off while the other group 22a-22d is on/off, also with a vehicle chassis frame 44, and primary battery 45 and secondary battery 46, a battery charging device 47, and an On/Off Grid System 49, power cable 50, and also retractable USB with power cable 51 plus side motorized doors 59a, 59b which can have a desired design, a see through canopy FIG. 18AA which also shows chair lift, and also an electromagnetic coupler device front 61, and rear 62 to couple with another vehicle employing an electromagnetic coupler device.

Referring now in greater detail FIG. 19 depicts a transportation type truck 1K having omni-directional driving capability with steering wheel 17 option. The omniwheels comprising transmission rod 43 and the universal joint device 42 actuate omniwheel rotation at the same time can actuate lift and extension thusly suspending chassis frame as the arrows show various actuating directions for outward/inward motion and side to side motion.

Referring now in greater detail FIG. 20 depicts two robotic omniwheel transportation types first is the semi truck 1LA which can tow a trailer 1LB and second is the semi truck chassis frame 44 and body 57 are designed to support a plurality of inner-motorized omniwheel apparatus 37a-37f which may comprise a fueled motor device 21, and as well an electric motor device 22 to work together thus when powered one group is off or is malfunctioning the other group is to spin freely thus allowing the other inner-motorized omniwheel groups to operate and carry on and thus preventing break down.

The operator may select a control system 2-8 mode and steering 17 wheel option and common driving operations floor pedal brake 15 and floor throttle pedal 16 to haul, as well, vehicle chassis frame 44 and body 57, On/Off Grid System 49, power cable 50 and with retractable USB with power cord 51, and primary batteries 45, and secondary battery(s) 46, and battery charging device 47 housed in battery compartment 48, and also employing a solar power device 54 coupled to the vehicle roof 60, and also, FIG. 20 also depicts a transportation type 1LB trailer or mobile container employing a plurality of inner-motorized omniwheel apparatus 37a-37f, and the control systems 2, 3, 4 which can plot a navigational route, and thus the unhitched trailer 1L can be autonomously navigated from a distance by using the detachable course-plotting panel controller 11 having telecommunication control to dock via the cell phone commanding the navigation to control the omniwheel yoke assemblies with U joint 42, 43, and also may employ wind turbine housing 52, wind turbines 53a-53j, air flow vents 54a, 54*b* and a solar power device 55, is to generate surplus battery power from renewable energy power which is produced while in tow 63.

Referring now in greater detail FIG. 19 is a transportation type 1M bus having a multiple occupant vehicle design and shown with raised omnichair 13 and employing a plurality of desired wheel types 38*a*-38, and method or control, 2-17 and also therein, a chassis and includes the power systems, and includes motorized doors, and an electromagnetic coupling devices front 61, rear 62.

Referring now in greater detail FIG. 22 a railcar 1N having rail shaped inner-motorized omniwheel apparatus 40 or 41, show three railcars which are magnetically linked together via electromagnetic coupling device front 61, and rear 62 thus railcars 1N can travel on tracks in a synchronized controlled manner 2-17. Conceptually a plurality of wind turbine assemblages 52, 53 are to transportationally generate electricity 63 while the railcar is in coasting motion, and solar power devices 54 may be employed to generate surplus power.

The specifications discuss in general terms the principal concept for the robotic vehicle and omniwheel assemblies, program software and cellular phone control applications, navigation controls and device's, also electronic and mechanical components for the chassis and cab contents which may be purchased.

The various embodiments specified vehicle contents describe in generic terms and are not technologically precise and thusly as claimed remains within accordance and it is apparent to those skilled in the art that many more entailed nuances are possible within the scope of the invention.

I claim:

1. An omnivehicle for motion in forward, reverse, and sideways directions, and for fully circular pivotal motion, said omnivehicle comprising:
    a chassis;
    a vehicle body comprising a motorized door and a canopy;
    a plurality of wheels, each of said wheels comprising:
        a motor disposed within a wheel shell cavity, a hydraulic braking system, a tread surface, hollow motor axle rods which connect the motor to a hub axle bearing, a rotor wheel coupler which couples the motor to a rotor wheel, and a shell band coupler which engages the inner surface of the wheel shell cavity and a circumference of the rotor wheel;
    an electromagnetic coupler device which selectively engages and disengages from another electromagnetic coupling device of another omnivehicle;
    a plurality of yokes, each of said plurality of yokes supporting each of said plurality of wheels, said plurality of yokes comprising:
        a yoke controller, a yoke gearbox, a yoke motor, a yoke suspension, a motorized universal joint, a hollow shaft, and a transmission rod frame expansion device which selectively raises and lowers the omnivehicle;
    a vehicle control and navigation system, said vehicle and navigation control system comprising:
        a CPU, having a Capability Statistics Indices system which defines the degree to which a process is or is not meeting a control method operation, a plurality of sensors which communicate data to the CPU, a retractable USB line, a navigational control joystick, a dash panel control device, a touch screen monitor, a remote controller having a remote port charger, a voice control system for integration with a cellular phone device, a brake pedal, a throttle pedal, a GPS system, a laser navigation system, a radar navigation system, a drive logic control system;
    a revolving floorboard which rotates on a hidden bearing rail;
    an elevating navigational omnichair is disposed on the revolving floorboard for providing an operator with a secured seating area and access to the vehicle control and navigation system;
    an air bag;
    a power system for providing power for vehicle operation, said power system comprising a power control system, a battery, a fuel tank, power cables, fuel lines, a grid connection, and a renewable energy system;
    wherein at least one of said motors is an electric motor, and another of said motors is a fueled motor; and
    wherein said fuel lines and power cables are disposed within the hollow shaft of the yoke.

* * * * *